Dec. 1, 1931.   J. I. TAYLOR   1,834,554
METHOD OF MAKING CHANNEL STRIPS
Filed Jan. 27, 1928
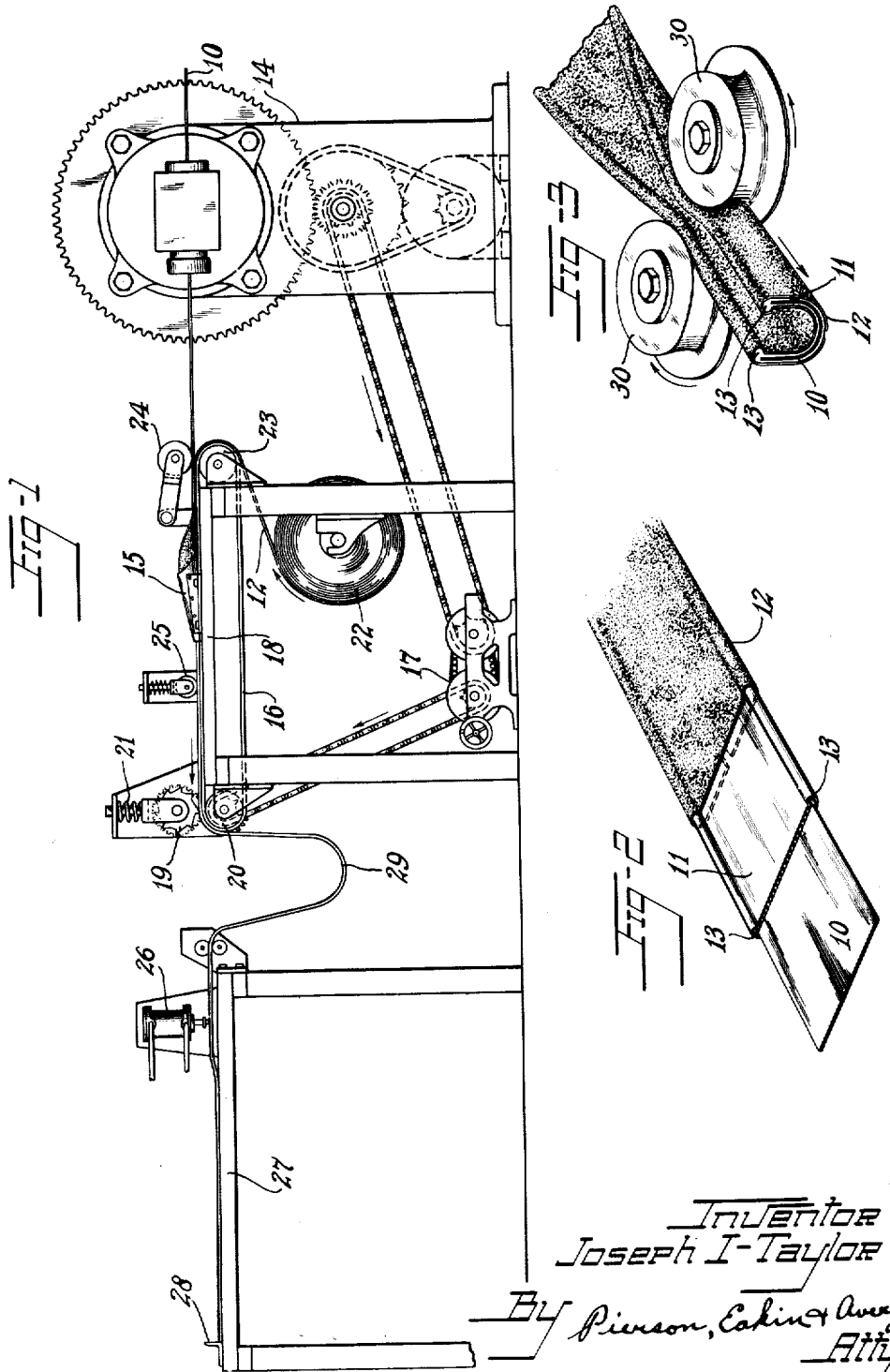
Inventor
Joseph I. Taylor
By Pierson, Eakin & Avery
Attys Patented Dec. 1, 1931

1,834,554

UNITED STATES PATENT OFFICE

JOSEPH I. TAYLOR, OF AKRON, OHIO, ASSIGNOR TO THE B. F. GOODRICH COMPANY, OF NEW YORK, N. Y., A CORPORATION OF NEW YORK

METHOD OF MAKING CHANNEL STRIPS

Application filed January 27, 1928. Serial No. 249,830.

This invention relates to channel strips such as are used as runways for the glass of automobile windows and its chief objects are to provide an improved channel strip adapted to grip the glass uniformly and with sufficient strength to seal against the glass and prevent loose play and yet to permit easy running of the glass; and to provide for facility and economy in the manufacture of such a strip.

I attain these objects by reinforcing with a thin strip of sheet metal a rubber channel strip of such form as to grip the glass primarily along the outer margins of the legs of the channel, the reinforcing strip preferably being of resilient metal and being given uniform cross-sectional form so that local binding of the glass will be avoided and the pressure of channel strip against the glass will be of constant force throughout the life of the strip. The channel strip is preferably formed by passing the metal strip in flat form through an extruding machine and thereby progressively forming upon the metal strip a cushion body of rubber of suitable form to give the desired cross-sectional form in the channel strip formed by bending the rubber-covered metal strip to trough form, and so bending the composite strip, either before or after vulcanizing it. An antifriction or decorative fibrous cover may be applied to the metal-reinforced rubber strip either before or after it has been bent to trough form and either before or after it is vulcanized, but preferably while the composite strip is still in flat form and unvulcanized, and I find that the bending of the composite strip does not result in objectionable wrinkling of the cover at the compression side of the bend or separation of the cover from the rubber layer.

Of the accompanying drawings:

Fig. 1 is a side elevation of apparatus adapted for performing certain steps in the practice of my invention in its preferred form.

Fig. 2 is a perspective view, with parts sectioned and removed, of a piece of the work as it appears before being bent to channel form.

Fig. 3 is a perspective view of a pair of bending rollers and the work therein illustrating the operation of bending the strip to channel form.

Referring to the drawings, the thin, initially flat, metal strip constituting the reinforcement, preferably of tempered but deformable steel, is shown at 10, the cushion layer of rubber thereon is designated 11, and an antifriction and decorative covering 12 of fibrous material such as felt is shown upon the rubber cushion layer. The rubber cushion layer is preferably formed with longitudinal beads 13, 13 extending along its margins on the side of the strip which is the inner side when the strip is bent to channel form, which beads, with the felt covering thereon, provide in the finished product overhanging ledges on the inner faces of the margins of the legs of the channel strip, adapted to bear more firmly upon the window glass than the adjacent portions of the legs do and thus to present a neat appearance and avoid crevices such as would collect dirt, and the form of the strip also is such that it will embrace glasses of different thicknesses without excessively weak or strong pressure.

The fibrous covering strip 12 is preferably continuous throughout the inner surface and the outer side surface of the channel, with its side margins extending onto the outer surface of the base of the channel and there terminating at a short distance from each other, leaving between their edges a longitudinal, middle zone of the cushion layer 11 without a covering, for economy of covering material and to provide a tolerance in avoiding overlap of the margins of the covering strip, which would result in an undesirable ridge on the surface of the product.

I find that notwithstanding the stiffness of the tempered steel strip 10 it may be suitably coated with the rubber cushion layer 11, in flat form, by drawing it through a rubber-extruding machine such as is shown at 14, and that, with the rubber coating thereon but still in flat form it may be conveniently covered with the felt strip 12 by drawing the two together through a folding sleeve 15. The folding sleeve preferably is mounted over the upper reach of an endless belt conveyor 16 geared to the extruding machine through a variable-speed drive device 17, the said reach sliding upon the upper face of a table 18, and a star wheel 19 is mounted over the delivery end-roll 20 of the conveyor, urged toward the latter by a spring 21 and geared to the said end-roll, the star wheel thus being adapted to draw the metal strip 10 through the extruding machine and, together with the rubber cushion layer thereon and with the covering strip 12, through the folding sleeve 15, the covering strip 12 being drawn from a supply roll 22 mounted under the table and passing about the receiving end-roll 23 of the conveyor into contact with the rubber-coated metal strip while the coating is in a fresh and tacky condition, which results in good adhesion of the covering strip.

A presser roll 24 is mounted over the conveyor end-roll 23 to press the rubber-coated metal strip progressively upon the covering strip while they are both in flat form and a presser roll 25 is mounted over the conveyor at the middle part thereof to press the folded-over margins of the covering strip against the cushion layer 11 as the covered strip passes from the folding sleeve.

The star wheel engages the work at a position at which the rubber cushion layer not only has been covered with the strip 12 but has cooled appreciably after emerging in a hot condition from the extruding machine. Both the covering and the cooling of the rubber layer contribute to a strengthening of the composite strip such as to permit it to withstand without damage the strong gripping force necessary for pulling the metal strip from a suitable source of supply and through the extruding machine and the star wheel is adapted to indent the metal strip and the covering thereon to assure sufficiently strong driving engagement.

The covered strip is preferably cut into lengths before being bent to troughed or channel form, as by means of a pneumatic cutter 26 mounted upon a measuring table 27 positioned near the delivery end of the conveyor 16 and provided with a gauge 28, the flat form of the composite strip permitting it to be fed through a depending reserve loop 29 to compensate for the intermittence of the measuring and cutting operation.

The severed lengths are bent to the channel form as shown in Fig. 3, preferably by passing them between a pair of bending rolls 30, 30 there shown, the rolls giving them uniform cross-sectional shape and permanently deforming the metal reinforcement to hold them in that shape. The composite strip may be vulcanized, permissibly in open heat, before the bending operation, but it preferably is first bent and then vulcanized, so that strain of the rubber opposed to the strength of the deformed metal will be relieved in the final product.

The finished channel strip is strong, durable, suitably resilient to provide permanently a suitable grip of the glass mounted therein, a substantial range as to the thickness of the glass with which it may be associated, and has neatness of appearance and desirable anti-friction properties. The metal strip, insulated by the rubber layer, is protected from moisture. The method of making the strip is economical and provides a strip having the several advantages mentioned.

Modifications are possible within the scope of my invention as defined in the appended claims.

I claim:

1. The method of making a channel strip which comprises applying a coating of hot, vulcanizable rubber composition to a strip of flat sheet metal by extrusion, progressively applying a covering strip to the coated metal strip and folding it laterally about the same while the metal strip remains in flat form and the coating thereon in a fresh and tacky condition, and thereafter so bending the covered strip as to give it a permanent channel form by permanent distortion of the metal.

2. The method of making a channel strip which comprises covering a flat strip of sheet metal with a layer of rubber and a fibrous cover, and then bending the composite structure to trough shape.

3. The method of making a composite strip of material which comprises drawing a metal strip through an extruding machine to cover it with plastic rubber and a fibrous covering strip therefor from a source of supply and the two of them into progressive contact with each other by engagement with the resulting composite strip in which the rubber is still unvulcanized.

4. The method of making a composite strip of material which comprises drawing a metal strip through an extruding machine to cover it with plastic rubber and a fibrous covering strip therefor from a source of supply and the two of them into progressive contact with each other by engagement with the resulting composite strip, the metal strip being entirely surrounded by the rubber layer and the engagement being with a portion of the strip in which the rubber is still unvulcanized.

5. The method of making a composite strip of material which comprises drawing a metal strip through an extruding machine to cover it with plastic rubber and a fibrous covering strip therefor from a source of supply and the two of them into progressive contact with each other by engagement with the resulting composite strip, and shaping the composite strip channel form of uniform cross-section by permanent distortion of the metal from a transversely flat condition.

6. The method of making a channel strip which comprises bending to trough shape a flat structure comprising a flat strip of sheet metal and a layer of unvulcanized rubber and a fibrous cover thereon, and then vulcanizing the rubber to unite the component parts of the composite structure.

In witness whereof I have hereunto set my hand this 25th day of January, 1928.

JOSEPH I. TAYLOR.

6. The method of making a channel strip which comprises bending to trough shape a flat structure comprising a flat strip of sheet metal and a layer of unvulcanized rubber and a fibrous cover thereon, and then vulcanizing the rubber to unite the component parts of the composite structure.

In witness whereof I have hereunto set my hand this 25th day of January, 1928.

JOSEPH I. TAYLOR.

CERTIFICATE OF CORRECTION.

Patent No. 1,834,554.      December 1, 1931.

JOSEPH I. TAYLOR.

It is hereby certified that error appears in the printed specification of the above numbered patent requiring correction as follows: Page 2, line 106, claim 3, after "with" insert the words "a portion of"; and that the said Letters Patent should be read with this correction therein that the same may conform to the record of the case in the Patent Office.

Signed and sealed this 10th day of January, A. D. 1933.

(Seal)

M. J. Moore,
Acting Commissioner of Patents.

CERTIFICATE OF CORRECTION.

Patent No. 1,834,554. December 1, 1931.

JOSEPH I. TAYLOR.

It is hereby certified that error appears in the printed specification of the above numbered patent requiring correction as follows: Page 2, line 106, claim 3, after "with" insert the words "a portion of"; and that the said Letters Patent should be read with this correction therein that the same may conform to the record of the case in the Patent Office.

Signed and sealed this 10th day of January, A. D. 1933.

(Seal)

M. J. Moore,
Acting Commissioner of Patents.